US007266173B2

(12) United States Patent
Han et al.

(10) Patent No.: US 7,266,173 B2
(45) Date of Patent: Sep. 4, 2007

(54) METHOD FOR DISTILLATION OF SULFUR FOR THE PREPARING RADIOACTIVE PHOSPHOROUS NUCLIDE

(75) Inventors: Hyon Soo Han, Taejon-si (KR); Ul Jae Park, Taejon-si (KR); Hyeon Young Shin, Taejon-si (KR); Kwon Mo Yoo, Taejon-si (KR)

(73) Assignee: Korea Atomic Energy Research Institute (KR)

( * ) Notice: Subject to any disclaimer, the term of this patent is extended or adjusted under 35 U.S.C. 154(b) by 351 days.

(21) Appl. No.: 10/163,723

(22) Filed: Jun. 4, 2002

(65) Prior Publication Data

US 2003/0095915 A1 May 22, 2003

(30) Foreign Application Priority Data

Sep. 14, 2001 (KR) ............................... 2001-56701

(51) Int. Cl.
*G21G 1/06* (2006.01)
*B01D 3/04* (2006.01)
*C01B 17/27* (2006.01)

(52) U.S. Cl. .................... 376/188; 202/237; 423/578.1

(58) Field of Classification Search ................ 376/188, 376/189; 424/1.11; 202/237, 159; 423/578.1
See application file for complete search history.

(56) References Cited

U.S. PATENT DOCUMENTS 2,206,634 A * 7/1940 Edoardo et al. ............ 376/188
3,023,835 A * 3/1962 Brashear .................... 73/23.26
3,362,795 A * 1/1968 Weisbeck ................... 423/107
3,833,469 A * 9/1974 Robson ..................... 424/1.61
4,017,583 A * 4/1977 Motojima et al. ............. 423/2
4,123,498 A * 10/1978 Rosenbaum et al. ........... 423/2
4,287,165 A 9/1981 Rupp et al.
4,374,706 A 2/1983 Molla
4,483,746 A 11/1984 Rosenhouse et al.

FOREIGN PATENT DOCUMENTS

GB 765489 * 1/1957
GB 1015285 * 12/1965

OTHER PUBLICATIONS

Sulfur, avaible online @ http://www.scescape.net/~woods/elements/sulfur.html., accessed Jun. 16, 2005.*

(Continued)

*Primary Examiner*—Ella Colbert
*Assistant Examiner*—Daniel L Greene, Jr.
(74) *Attorney, Agent, or Firm*—Bachman & LaPointe, P.C.

(57) ABSTRACT

A method for distillation of sulfur for preparing radioactive phosphorous nuclide includes the steps of: charging powdered sulfur into a target tube designed to have an upper and a bottom neck; degassing the target tube to form a vacuum therein, followed by heating the upper neck to seal the target tube; irradiating neutrons into the sealed target tube to produce radioactive phosphorous nuclide; heating the distillation zone to distill the remaining unreacted sulfur; and cleaving the target tube at the bottom neck to separate the distillation and the cooling zone from each other, the separated zones containing the radioactive phosphorous nuclide and the unreacted sulfur, respectively, whereby the radioactive phosphorous nuclide of high purity can be prepared while the sulfur can be recovered at high efficiency.

8 Claims, 9 Drawing Sheets

OTHER PUBLICATIONS

Phosporus, available onliune @http://www.scescape.net/~woods/elements/phosphorus.html#top, accessed Jun. 16, 2005.*
Preparation of Carrier Free Phosphorus by Neutron Irradiation, Yeh et al., Ho Tzu K'o Hsueh vol. 3, No. 4, Sep. 1962.*
Preparation of Phosphorus-33 by irradiation of enriched sulfur-33 in highly thermalized flux, R.E.Lewis et al., ORNL-4051, Jan. 1967.*
Phosphorus-32, ORNL-3633, Jun. 1964.*
Apparatus for large scale production of phosphorus-32, Arrol, W.J., Nucleonics vol 11 #5 pp. 26-28 TK9001 N8, May 1953.*
Rengan et al., Ultrafast Chemical Separations (1993), NAS-NS-3118, available @ http://darwin.nap.edu/books/NI000150/html, last accessed Feb. 27, 2006.*
Phosphorus PentaSulfide, available @ http://www.chemicalland21.com/arokorhi/industrialchem/inorganic/PHOSPHORUS%20PENTASULPHIDE.htm, last accessed Feb. 27, 2006.*
Phosphorus Pentoxide, MSDS, available @ http://www.jtbaker.com/msds/englishhtml/p4116.htm, last accessed Feb. 27, 2006.*
Samsahl, K., Atompraxis 4, 14, 1958, pp. 14-17.*
Razbash: A. A. et al., Winning 32P in the BR-10 Reactor, pp. 333-335, Atomnaya Ehnergiya 70(4), 260, 1991.*
Gharemano, A. R. et al. Preparation of Ortho-Phosphoric Acid /H3 32P O4/ For Application in Medicine and Agriculture in Iran, pp. 49-53, Radiochemical and Radioanalytical Letters Hungary 58(1), 49, 1983.*
Parker, C.L. "Recent Inventions" Jrn of Ind. Eng. Chem. Aug. 1913.*
Ye. A. Karelin et al., Radionuclide Production Using a Fast Flux Reactor, Applied Radiation and Isotopes, vol. 53, pp. 825-827, (2000).

* cited by examiner

METHOD FOR DISTILLATION OF SULFUR FOR THE PREPARING RADIOACTIVE PHOSPHOROUS NUCLIDE

BACKGROUND OF THE INVENTION

1. Field of the Invention

The present invention relates to a method for distillation of sulfur for the preparing radioactive phosphorous nuclide. More particularly, the present invention relates to an economically favorable and efficient method in which sulfur is converted into radioactive phosphorous nuclide by neutron irradiation while unreacted sulfur is separated from the radioactive phosphorous nuclide by distillation and recovered at high efficiency, with the radioactive phosphorous nuclide remaining high in purity.

2. Background of the Related Art

Emitting $\beta^-$ radiation, nuclides such as $^{32}P$ and $^{33}P$ find many applications in various fields, including medical treatment, synthesis of labeling compounds, bioengineering experiments, etc.

The phosphorous nuclide ($^{32}P$) can be prepared by the nuclear reaction of $^{32}S(n,p)^{32}P$ or $^{31}P(m,\gamma)^{32}P$ In spite of its guaranteeing very simple chemical treatment after neutron irradiation, the (n,γ) reaction is only adopted in special cases because the uses of the resulting $^{32}P$ are limited due to its low specific radioactivity. For use in medical treatment or research experiments, the phosphorous nuclide $^{32}P$ is usually obtained by separating it from the sulfur target after $^{32}S(n,p)^{32}P$ nuclear reaction.

Depending on physical and chemical statuses of the sulfur, separation of the $^{32}P$ generally resorts to the following methods.

$^{32}P$ may be purified by a wet extraction method in which strong and weak acids are used to extract the phosphorus nuclide from the sulfur target. According to the wet extraction method, $^{32}P$ is extracted from finely powdered sulfur irradiated with neutrons in boiling water in the presence of acid [Samsahl, K., Atompraxis 4, 14, 1958; Razbash, A. A. et al., Atomnaya Ehnergiya 70(4), 260, 1991]. In this regard, 2-octanol is used as a wetting agent. This method suffers from the following disadvantages. The extraction yield varies with the particle size of the irradiation target sulfur and is significantly decreased when the target is melted or solidified due to the exothermal heat during neutron irradiation. Additionally, the use of acid induces impurities and leaves much solid waste behind, thus completion of the extraction requires additional purification processes.

Alternatively, $^{32}P$ may be prepared by irradiating the sulfate or polysulphide target with neutrons, dissolving the target in water, and then adsorbing or coprecipitating the $^{32}P$ thus formed. Because it requires multi-stage processes and produces low recovery yields, this method is scarcely used.

Suggested as an alternative which can solve the above problems were sulfur distillation methods which are generally classified into: atmospheric distillation in which sulfur is distilled at as high as 500° C. in a nitrogen atmosphere; vacuum distillation in which sulfur is distilled at as low as 180-200° C. under a pressure of 1-10 mmHg [Gharemano, A. R. et al., Radiochemical and Radioanalytical Letters Hungary 58(1), 49, 1983, Ye. A. Karelin et al., Applied Radiation Isotopes 53, 825-827, 2000]. The former employs an inert gas as a carrier in order to reduce the possibility of fire. In the latter method, distillation is carried out at a temperature lower than the ignition point of sulfur by reducing the pressure. These distillation methods are advantageous in that products of high purity can be obtained since no reagents are added during the separation of phosphorous nuclide from sulfur. However, the methods require facilities such as a vacuum system, a gas-feeding apparatus and a cooling apparatus in order to distill the sulfur irradiated with neutrons in hot cells or glove boxes, as well as require the pressure and temperature to be controlled in relatively narrow ranges. Additionally, where concentrated sulfur is used, it is difficult to recover the whole amount of very expensive sulfur, which brings about an economic loss.

Therefore, there remains a need for an improved method that can prepare phosphorus nuclides of high purity easily and very economically.

SUMMARY OF THE INVENTION

Leading to the present invention, the intensive and thorough research into the preparation of phosphorus nuclides, conducted by the present inventors in an aim to solve the above problems encountered in prior arts, resulted in the finding that a temperature gradient formed over a target tube irradiated with neutrons allows sulfur to move toward the low temperature site and thus be easily separated from phosphorous nuclide which remains high in purity.

Thus, it is an object of the present invention to provide a method for safely and efficiently distilling sulfur for preparing radioactive phosphorous nuclide of high purity.

It is another object of the present invention to provide radioactive phosphorous nuclide with high purity.

It is still another object of the present invention to provide a method for distilling sulfur using a target tube having thermal profiles.

Based on the present invention, the above object could be accomplished by a provision of a method for distillation of sulfur for preparing radioactive phosphorous nuclide, comprising the steps of:

(a) charging powdered sulfur into a distillation zone of a target tube designed to have an upper neck, and a bottom neck which functions as a separation zone dividing the target tube into a distillation zone and a cooling zone;

(b) degassing the target tube to form a vacuum therein, followed by heating the upper neck to seal the target tube;

(c) irradiating neutrons into the sealed target tube to produce radioactive phosphorous nuclide;

(d) heating the distillation zone to distill the remaining unreacted sulfur, but not the phosphorus nuclide and to allow the gasified sulfur to move over the bottom neck into the cooling zone; and (e) cleaving the target tube at the bottom neck to separate the distillation and the cooling zone from each other, the separated zones containing the radioactive phosphorous nuclide and the unreacted sulfur respectively, whereby the radioactive phosphorous nuclide of high purity can be prepared while the sulfur can be recovered at high efficiency.

In one embodiment according to the present invention, an apparatus for distilling sulfur for preparing radioactive phosphorous nuclides comprises:

(a) a distillation heater with heat coils for providing heat to the target tube;

(b) a heat controller for controlling the heat transferred to the target tube in conjunction with a temperature measurer;

(c) a tubular vessel for adapting the target tube to the distillation apparatus; and (d) a heat insulator for insulating the tubular vessel.

In one another embodiment according to the present invention, a target tube of the claim designed to have an upper and a bottom neck is used.

BRIEF DESCRIPTION OF THE DRAWINGS

The above and other objects, features and other advantages of the present invention will be more clearly understood from the following detailed description taken in conjunction with the accompanying drawings, in which:

FIG. 10 is a chromatogram obtained after a paper chromatography of $H_3{}^{32}PO_4$, which was prepared by the distillation method of sulfur in accordance with the present invention.

DETAILED DESCRIPTION OF THE INVENTION

It is also to be understood that the terminology employed herein is used for the purpose of describing particular embodiments only and is not intended to be limiting since the scope of the present invention will be limited only by the appended claims and equivalents thereof.

In describing and claiming the present invention, the following terminology will be used in accordance with the definitions set out below.

As used herein, 'sulfur' means elementary sulfur ($^{32}S$) including any forms, without limitation, powder, if need, purified by conventional methods.

As used herein, a 'target tube' means a tubular vessel, without limitation, designed to being able to contain a target material ($^{32}S$) with a neck including any sizes.

As used herein, 'phosphorous nuclides' mean $^{32}P$ and $^{33}P$ prepared by the nuclear reaction of $^{32}S(n,p)\,^{32}P$ or $^{33}S\,(n,p)\,^{33}P$.

Figure 1:
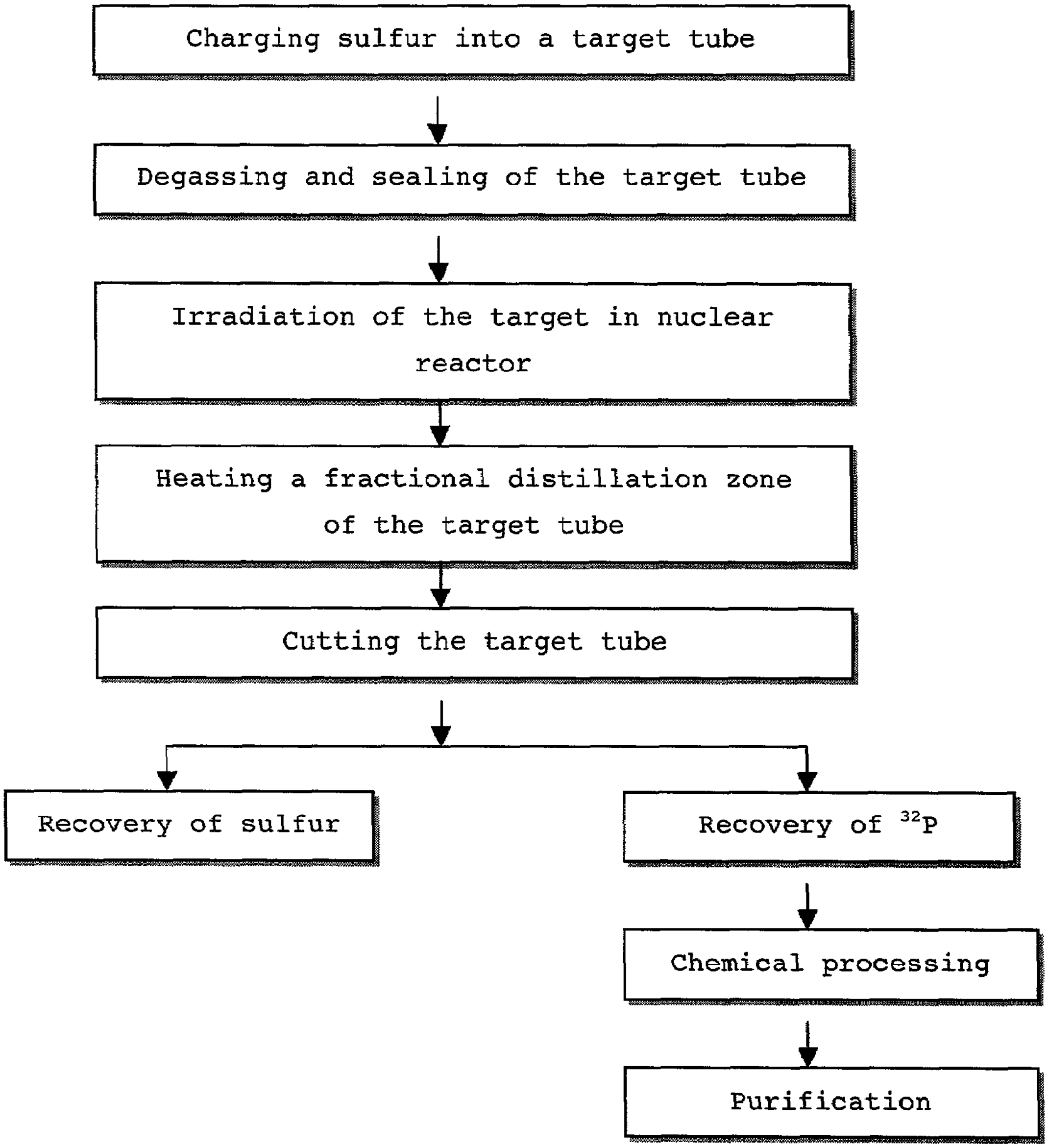
FIG. 1 is a process flow showing the preparation of radioactive phosphorous nuclide by the distillation of sulfur of the present invention.

With reference to FIG. 1, the preparation of radioactive phosphorus nuclides by the distillation of sulfur according to the present invention is briefly described in a process flow diagram. As seen, the preparation of radioactive phosphorus nuclides starts with the charging of sulfur into a target tube designed to have an upper and a bottom neck. Then, the tube is degassed to form a vacuum. The upper neck is heated with a torch to seal the target tube, followed by placing the vacuum-sealed target tube in a shielded environment. Subsequently, neutrons are irradiated to the charged sulfur to cause a nuclear reaction. Using a distilling apparatus, unreacted sulfur, except for phosphorus nuclides, is transferred into a cooling zone. Afterwards, the target tube is cleaved at the bottom neck to recover unreacted sulfur and the phosphorous nuclide thus formed, separately. The recovered phosphorus nuclide is purified to higher homogeneity by a process including an acid treatment.

Figure 2:
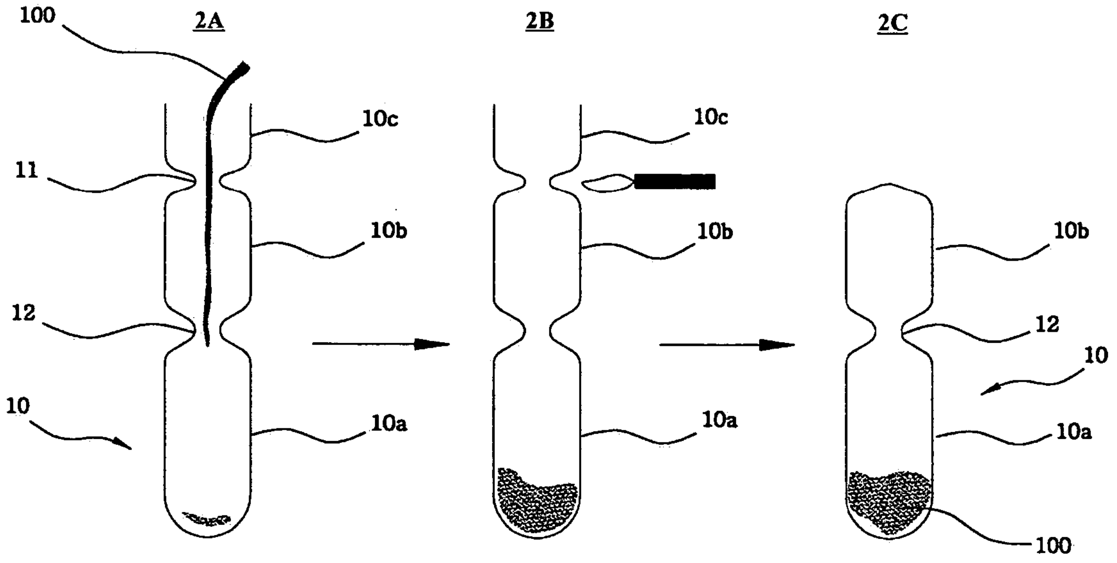
FIG. 2 is a schematic view showing the structure of a target tube useful in the present invention, the charging of sulfur in the target tube, and the sealing of the target tube.

With reference to FIG. 2, there is shown a target tube 10 useful in the present invention, which is in an open state, and, after being charged with sulfur 100, in a sealed state. As seen in FIG. 2A, the target tube 10 in an open state has an upper neck 11 and a bottom neck 12 and is divided into three parts (10*a*, 10*b* and 10*c*). After being charged with powdered sulfur 100, the target tube 10 is degassed with the aid of a vacuum pump, to form a vacuum therein. Heating the upper neck 11 with a torch (FIG. 2B) then seals the target tube 10 (10*a*+10*b*) (FIG. 2C).

In order to irradiate neutrons onto the sulfur 100, the sealed target tube 10 is placed in a shielded environment. The irradiation of neutrons converts the sulfur 100 into a phosphorus nuclide 300. The shielded environment may consist of a general shielding apparatus well known in the art. Upon neutron irradiation, a $^{32}S(n,p)^{32}P$ nuclear reaction (or $^{33}S(n,p)^{33}P$ nuclear reaction) is caused to produce $^{32}P$ 300 (or $^{33}P$) which exists, together with the unreacted sulfur 100*a*, in a distillation zone of the target tube 10.

Most of the non-sublimate materials within sulfur 100 after the neutron irradiation remain in the distillation zone as phosphorus nuclides 300 do, so that the sulfur powder 100 used as the target must be of high purity. That is, sulfur 100 for use in the present invention must be in a concentrated form or must be purified to high homogeneity. Depending on the vacuum pump used, the pressure of the sealed, vacuum target tube 10 preferably falls within the range of about 0.1 to 0.01 torr.

By heating, the upper neck 11, as described above, is melted to seal the target tube 10, while the bottom neck 12 functions to prevent the countercurrent of the unreacted sulfur 100*a* from the cooling zone upon distillation of said unreacted sulfur 100*a*.

The target tube 10 used in the present invention is not particularly limited if it can transmit the neutron radiation to convert sulfur 100 into phosphorus nuclides 300, and is preferably made of hard glass. Most preferable is a quartz tube.

Figure 3:
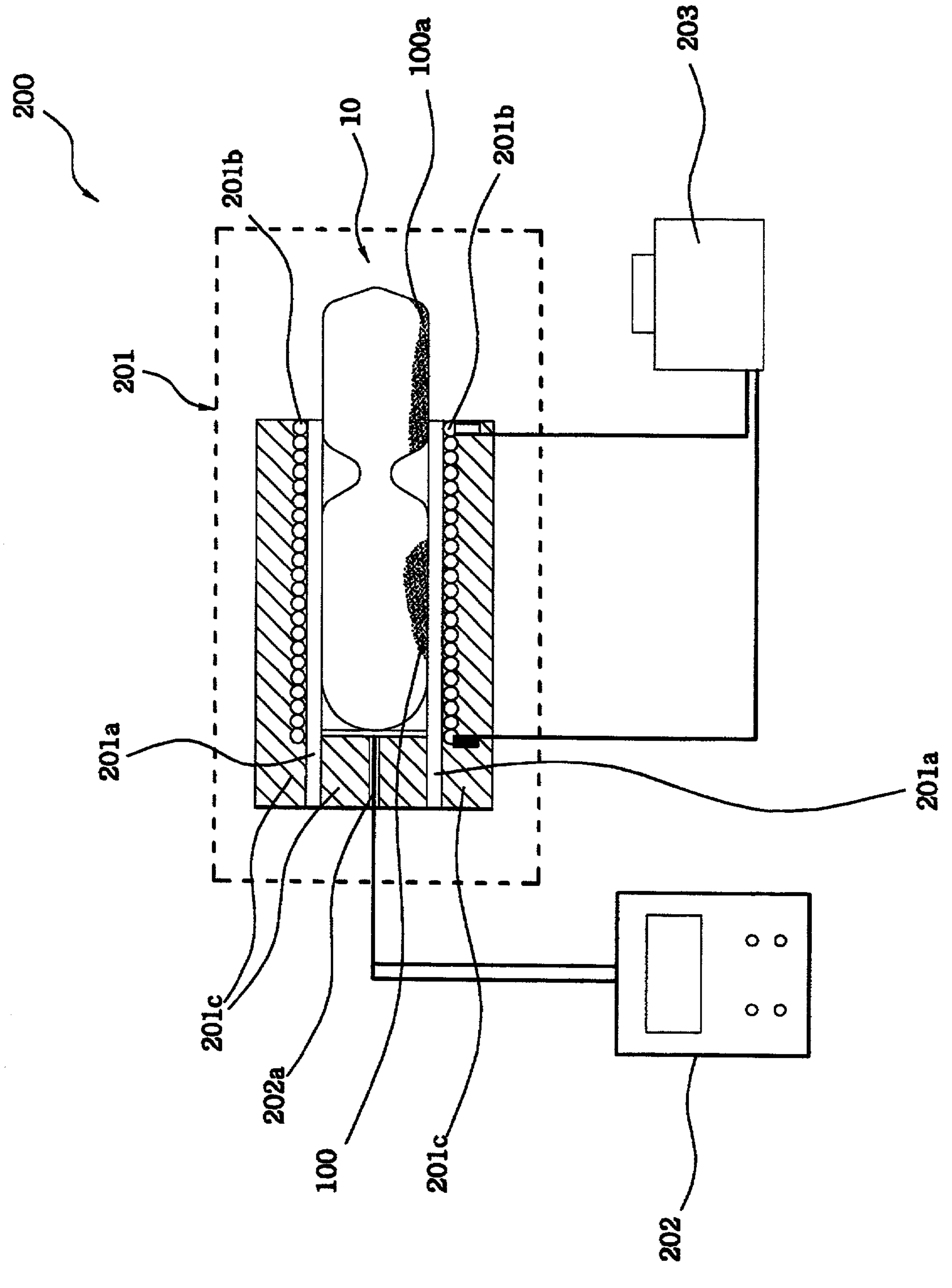
FIG. 3 is a schematic diagram showing the structure of a distillation system useful in the present invention.

After completion of the neutron irradiation, the target tube 10 is mounted onto a distillation apparatus 200 in which the unreacted sulfur 100*a* other than the phosphorus nuclide 300 is moved over the bottom neck 12 into the opposite zone within the target tube 10. Referring to FIG. 3, there is shown a distillation apparatus 200 useful in the present invention, in which the target tube 10 is mounted. The distillation apparatus 200 comprises a distillation heater 201 with a heat coils 201*b* for providing heat to the target tube 10, a heat controller 203 for controlling the heat transferred to the target tube 10, in conjunction with a temperature measurer 202 with a temperature probe 202*a*, a tubular vessel 201*a* for adapting the target tube 10 to the distillation apparatus 200 and a heat insulator 201*c*. In order to receive the target tube

10, the tubular vessel 201*a* with a conductor i.e, metal is designed to have an open side and an inner diameter larger than the outer diameter of the target tube 10.

To adapt the target tube 10 to the distillation heater 201, the distillation zone containing a mixture of the unreacted sulfur 100*a* and the nuclear reaction product phosphorus nuclide 300 is fitted into the closed portion of the tubular vessel 201*a*, while the cooling zone for recovering the unreacted sulfur 100*a* is positioned in the open portion.

After being distilled by the heat provided from the heater 202, the unreacted sulfur 100*a* moves to the cooling zone positioned in the open portion of the tubular vessel 201*a*, and is air-cooled therein.

Figure 4A:
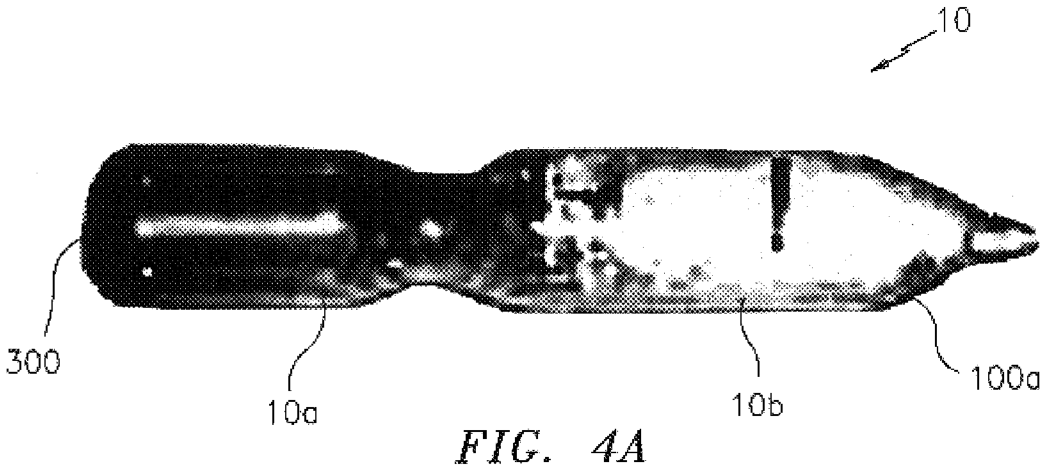
FIG. 4 is a photograph showing the migration of sulfur from a distillation zone to a cooling zone after the distillation of sulfur in the target tubes, which are inserted to lengths of 7 cm (a) and 8 cm (b) into the distillation heater of the distillation system.
Figure 4B:
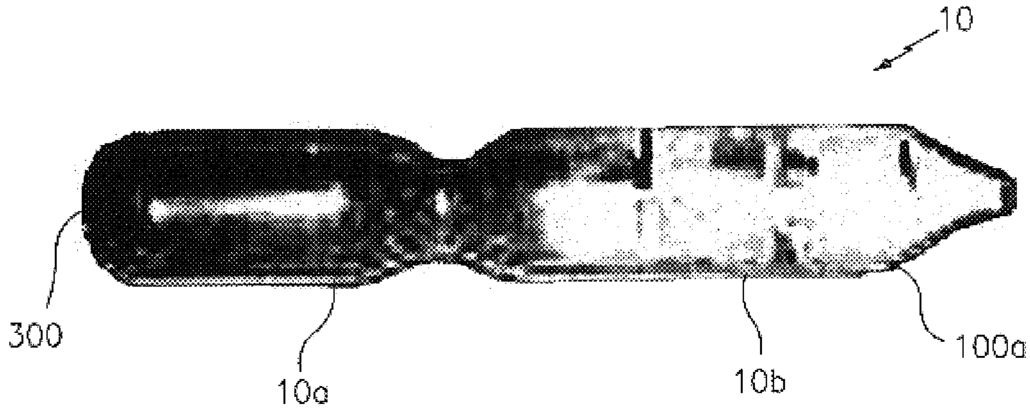

The position of the tubular vessel 201*a* relative to the target tube 10 mounted into the distillation apparatus 200 is found to have a great influence on the distillation time and yield. In order to examine the effect of the position of the target tube 10 on the separation of sulfur 100, distillation was carried out at 180° C. at 0.1 torr in target tubes 10 inserted in the tubular vessel 201*a* to different lengths. With reference to FIG. 4, there are shown the results obtained from the target tubes inserted 7 cm (a) and 8 cm (b) into the tubular vessel 201*a*. As can be seen, when a greater length of the target tube is inserted, the sulfur is moved to and condensed at a site of the cooling zone (10*b*), which is more distant from the distillation zone. The results show that, when the temperature distribution inside the target tube 10 is not uniform, but forms a gradient such that the temperature is higher than 180° C. at the distillation zone and lower than 180° C. at the cooling zone, the unreacted sulfur 100*a* readily moves from the distillation to the cooling zone. Additionally, like the neck of the target tube 10, a flow-hindering structure (separation zone) must be provided between the distillation zone and the cooling zone. This flow-hindering structure plays an important role in separating the unreacted sulfur 100*a* from the product phosphorus nuclide 300. Because the unreacted sulfur 100*a* is cooled at lower than 160° C. into a liquid phase in the cooling zone and has an increased viscosity, there exists a possibility that the unreacted sulfur 100*a* might move backwardly into the distillation zone. However, although the unreacted sulfur 100*a* may flow from the start point of the cooling zone toward the distillation zone as shown in FIGS. 4*a* and 4*b*, the countercurrent into the distillation zone does not occur due to the presence of the neck in the target tube 10.

A detailed description will be given of the distillation process of the present invention, below.

Heating the target tube 10 in the distillation apparatus 200 gasifies the sulfur 100. All gases move into the cooling zone, whereas the product $^{32}$P 300 still remains attached to the inner wall of the target tube 10 within the distillation zone. When the distillation zone of the target tube 10 is heated at 160-240° C., the unreacted sulfur 100*a*, except for the produced phosphorus nuclide 300, is distilled in the distillation zone and condensed in the cooling zone. The distillation temperature is preferably a temperature of 180 to 220° C. This distillation temperature is high enough to distill the sulfur, considering the distillation point of sulfur 100 and the fact that the inner pressure of the target tube 10 ranges from 0.1 to 0.01 torr. Preferably, the distillation is carried out at 180° C. when the inner pressure of the target tube 10 is 0.1 torr. If a temperature below the lower limit of the preferable distillation temperature is applied, the sulfur 100 is not sufficiently distilled and is difficult to recover in its entirety, resulting in economic loss.

Distillation time for the sulfur 100 is dependent on the quantity of the sulfur 100 in the target tube 10. According to one embodiment of the invention, it was found that it takes approximately 1.5-2 hours to completely distill 1 g of sulfur powder 100 at 180° C. at 0.1 torr in a target tube 10 with a dimension of 1.1×12 cm (outer diameter×length).

Once gasified, the sulfur 100*a* moves over the flow-hindering structure, that is, the neck 12 (separation zone), into the cooling zone and then is condensed. In the cooling zone, the unreacted sulfur 100*a* is increased in viscosity and condensed into a liquid phase, which might flow backwardly into the distillation zone. However, the bottom neck 12 in the target tube 10, as demonstrated in FIGS. 4*a* and 4*b*, prevents such a countercurrent.

Figure 5:
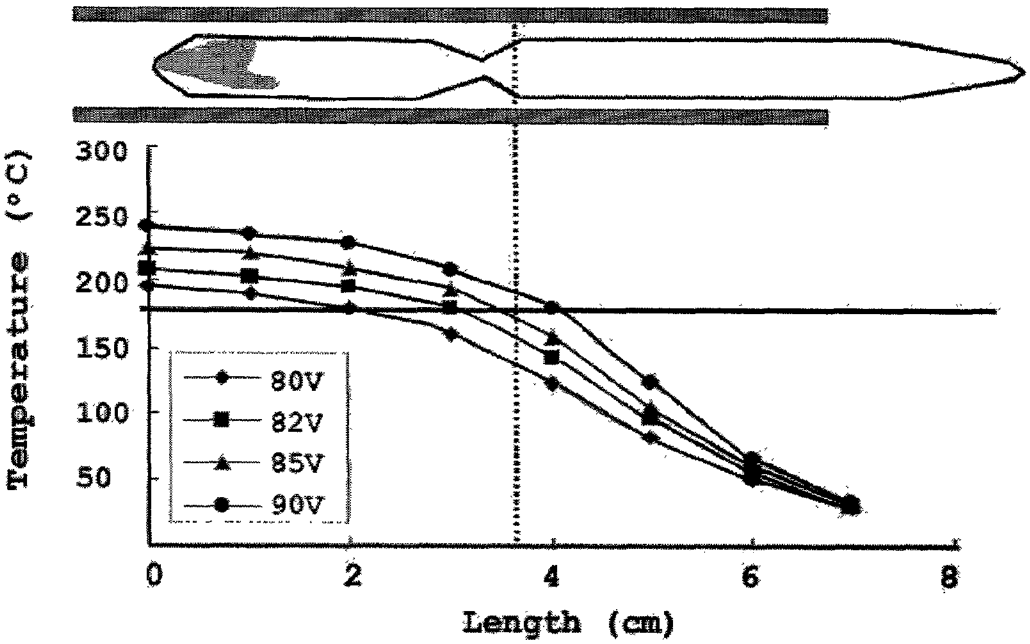
FIG. 5 provides thermal profiles showing a thermal gradient throughout the tubular vessel of the distillation system.

The target tube 10 may be divided into three zones: distillation (a), separation (b) and cooling zones (c). There is a temperature gradient throughout from the distillation zone to the cooling zone during distillation, as depicted in FIG. 5. According to the temperature profiles of FIG. 5, a temperature gradient from approximately 180 to 200° C. is formed over the distillation and cooling zones, allowing the gasified sulfur to be effectively recovered in a powder form. The cooling of the target tube 10 may resort to an external cooling water feeder, although this be sufficiently accomplished by allowing the target tube 10 to remain in contact with external air at room temperature.

Finally, to recover the $^{32}$P 300 (or $^{33}$P) and the unreacted sulfur 100*a*, the target tube 10 is cleaved at its neck, followed by a suitable chemical treatment. The unreacted sulfur 100*a* may be reused without further treatment.

The $^{32}$P 300 (or $^{33}$P) remaining in the target tube 10 is leached by the addition of acid, and the leachate is purified to afford a radioactive isotope at a high purity. The purification may be carried in a conventional manner, and preferably by chromatography.

After the cleavage of the target tube 10, the tube fragment 10*b* containing the unreacted sulfur 100*a* may be joined to another empty tube fragment by use of a torch to give a fresh target tube 10 useful in the present invention.

Figure 6:
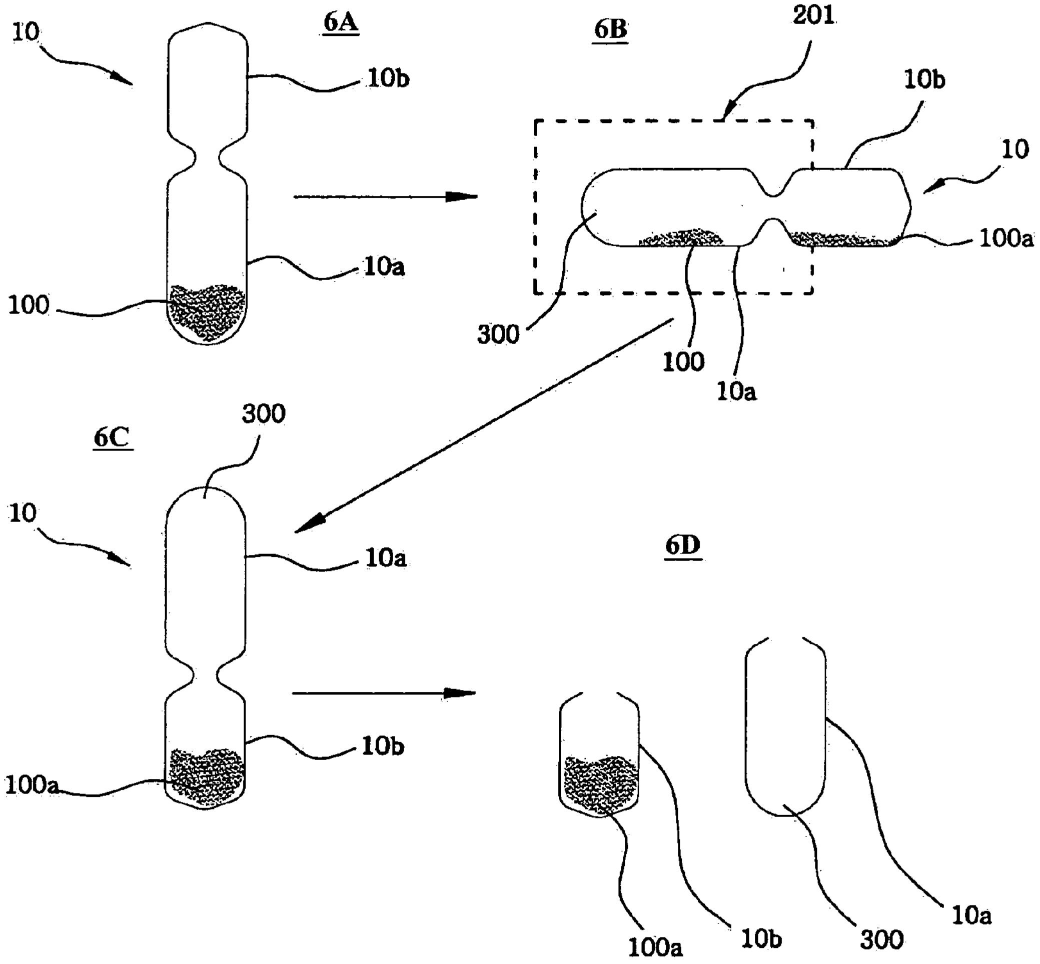
FIG. 6 is a schematic view showing a procedure of treating the target tube during and after the distillation of sulfur.

Method of distillation of sulfur in accordance with the present invention hereinabove described can be summarized schematically as FIG. 6. Referring to FIG. 6A, sulfur 100 is positioned in a sealed target tube 10. Next, referring to FIG. 6B, as heating of the target tube 10 is progressing in a distillation heater 201, phosphorous nuclides 300 remain in the distillation zone 10*a* and distilled unreacted sulfur 100*a* is condensed in the cooling zone 10*b*. Next, referring to FIG. 6C, the heating is completed when unreacted sulfur cannot be seen in the distillation zone 10*a* to the naked eye. Finally, referring to FIG. 6D, the target tube is cleaved to recover the phosphorous nuclides 300 and the unreacted sulfur 100*a*, and a suitable chemical treatment is followed.

In accordance with the present invention, the movement of the unreacted sulfur 100*a* is found not to occur when the target tube 10 is not vacuumed by degassing. By contrast, all of the unreacted sulfur 100*a* moves into the cooling zone in the presence of a temperature gradient over the vacuum target tube 10, which leads to the unreacted sulfur 100*a* recovery yield of 99.9% or higher.

Therefore, without requiring complex distillation apparatuses and vacuum and cooling systems, the distillation method of the present invention is very simple in comparison to conventional distillation methods, as well as being able to easily distill sulfur in the presence of a temperature gradient which is formed from the distillation to the cooling zone according to the vacuum level of the target tube 10. Additionally, the method of the present invention can be industrially utilized because it can be easily scaled up for the mass production of phosphorous nuclides 300.

The phosphorous nuclides ($^{32}P$) 300 prepared in accordance with the present invention is found to show a nuclide purity of 99% or higher and a radiochemical purity of 99% or higher, with a solid content of 0.2 mg/ml or less. Highly pure phosphorous nuclides ($^{32}P$) 300 has many applications in various industries, including radiotherapy, synthesis of radioactive labeling compounds, bioengineering research, etc.

Having generally described this invention, a further understanding can be obtained by reference to certain specific examples, which are provided herein for purposes of illustration only and are not intended to be limiting unless otherwise specified.

EXAMPLE 1

1. Purification of Sulfur

Powdered sulfur (MERCK ART 7892) was charged into a subliming reactor, and heated at 150° C. to melt. The subliming reactor was connected with a vaporizing apparatus to reduce its inner pressure to 100 mm of Hg and then heated to at 300° C. Sublimed sulfur- was moved to and condensed at a receiving flask to afford a pure yellowish sulfur. The obtained sulfur was purified repeatedly three times according to this procedure to afford purified sulfur.

2. Degassing and Distillation

The sulfur purified in the above step 1) was ground and charged into a target tube, which was made of quartz in a variety of sizes (see Table 1). After being charged with sulfur, the target tube was degassed with the aid of a vacuum pump to form a vacuum state. The target tube was then sealed by heating with a torch, as described in the procedure of FIG. 2. After sealed target tube was placed in a distillation apparatus, distilling was carried out until the sulfur could no longer be visible to the naked eye in the distilling zone. The conditions of inner pressure and temperature of target tube are as follows.

TABLE 1

| No. | amount of sulfur (g) | target tube dimensions (diameter × length) | Temperature (° C. ) | inner pressure of target tube (torr) | distilling time (hours) |
|---|---|---|---|---|---|
| 1 | 0.5 | 1.1 cm × 7.3 cm | 180 | 0.1 | 1 |
| 2 | 1 | 1.1 cm × 12 cm | 240 | atmospheric | — |
| 3 | 1 | 1.1 cm × 12 cm | 180 | 0.1 | 2.3 |
| 4 | 1 | 1.1 cm × 12 cm | 180 | 0.1 | 2.2 |
| 5 | 1 | 1.1 cm × 12 cm | 220 | 0.1 | 1.5 |
| 6 | 1 | 1.1 cm × 12 cm | 240 | 0.1 | 1.2 |
| 7 | 3 | 2.6 cm × 7.3 cm | 240 | 0.1 | 3 |

EXPERIMENTAL EXAMPLE 1

1. Recovery Yield of Sulfur

To determine yield of the sulfur distilled in the above Example 1, the target tube was cleaved and the sulfur in the cooling zone was recovered. Then, the amount of sulfur in the cooling zone of the each target tube was weighed using a precision balance. As a result, it was confirmed that the each yield of sulfur recovered in item Nos. 1-7 of Table 1 was over 99.9%.

2. Effect of Distilling Temperature

To determine effect of distilling temperature, distillation of sulfur was carried out as follows.

Figure 7:
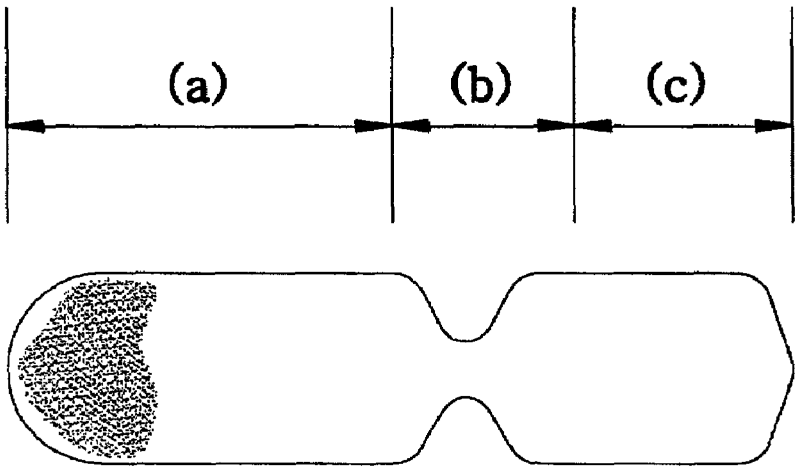
FIG. 7 is a schematic view showing the division of the target tube into three discrete zones: a distillation zone (a), a separation zone (b), and a cooling zone (c), according to temperatures.

After the insertion of a probe into a glass tube of the same size as the target tube (FIG. 3), the probe was heated to various temperatures, i.e., 80V (145° C.), 82V (160° C.), 85V (180° C.), 90V (210° C.), using a SLIGHDAX (Daelim Electric Corp., D45(220V)) as a temperature-controller. The variation of temperature at each voltage was detected at intervals of 1 cm relative to the total length of the target tube, thus obtaining the result shown in FIGS. 5 and 7. FIG. 5, in particular, shows the thermal gradient throughout the tubular vessel of the distillation system at each voltage, and FIG. 7 illustrates the division of the target tube into three discrete zones. As shown in FIG. 5, the target tube has a thermal profile (or temperature gradient) in which the inner temperature of the target tube degrades gradually. And as shown in FIG. 7, the target tube is divided into each fractional zone -(a) a distillation zone; (b) a separation zone; and (c) a cooling zone according to its inner temperature. Since the temperature difference between (a) the distillation zone and (c) the cooling zone is about 180~200° C., the distillation of sulfur can be effectively performed using the target tube.

3. Effect of Inner Pressure of the Target Tube

To determine effect of inner pressure of the target tube, the distillation of sulfur in a variety of inner pressure and temperature was carried out as follows.

Figure 8A:
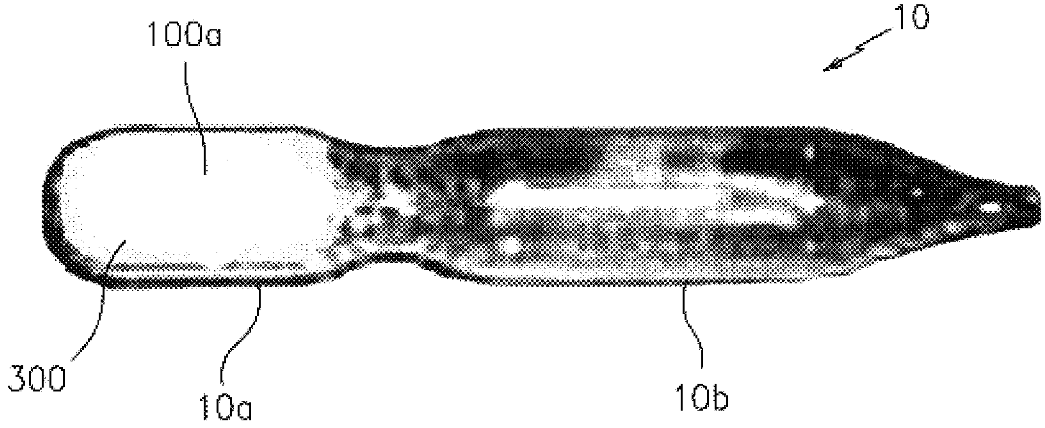
FIG. 8 is a photograph showing positions of sulfur after sulfur is distilled at 240° C. in a target tube, which is sealed at atmospheric pressure (a) and at 180° C. in a target tube, which is sealed under vacuum and inserted to a length of 7 cm into a distillation tube (b)
Figure 8B:
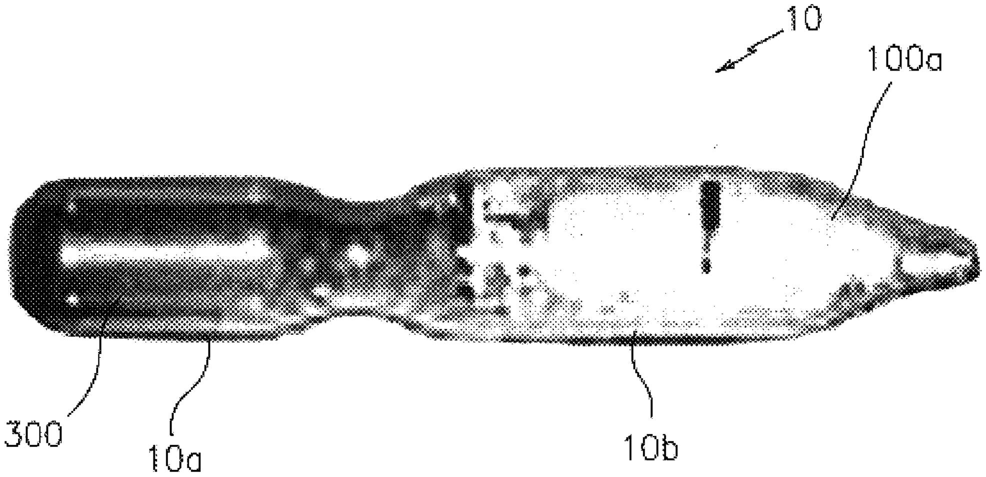

One target tube was sealed at atmospheric pressure and distilled at 240° C. (FIG. 8A) and the other target tube was sealed at 0.1 torr and distilled at 210° C. (FIG. 8B). The two target tubes were inserted by a length of 7 cm into a distillation tube (FIG. 8B). For the target tube shown in FIG. 8A, it was found that the molten sulfur did not move to the cooling zone (c), wholly remaining in the distillation zone (a). On the contrary, FIG. 8B shows that total amount of the molten sulfur moved to the cooling zone. These results indicate that it can be more effective to distill sulfur when the target tube is degassed and sealed.

EXAMPLE 2

1. Preparation of Radioactive Phosphorous Nuclide ($^{32}P$)

Radioactive phosphorous nuclide was prepared according to the method of the present invention.

Five grams of elemental sulfur (powder) was charged into a target tube having a dimension of 1.1 cm×12 cm (diameter×length). The tube was degassed with the aid of a vacuum pump to reach an inner pressure of 0.1 torr, and then sealed by heating with a torch. The target tube was inserted into an aluminum capsule immersed in a bath of cooling water. Once cooled down, the aluminum capsule was sealed by cold rolling.

The sealed capsule was inserted into an irradiation reactor (IP No. 15) in a HANARO reactor (kept by the inventor) for producing an isotope and was then irradiated for 72 hours. The fast neutron flux of irradiation hole was $2.38\times10^{12}$ n/cm$^2$·s. The used sulfur was highly purified in the same procedure as described in Example 1 (purity >99%).

After the completion of irradiation, the target tube isolated from the aluminum capsule was inserted into the distillation apparatus, heated to maintain the temperature around the neck at 180° C. under regulated voltage and then distilled for one hour. As the distillation of sulfur was progressing, yellowish powdery sulfur was observed in the cooling zone. After the completion of distillation, the powdery sulfur was found to be present in the cooling zone.

After the target tube was cleaved at its neck to recover phosphorous nuclides ($^{32}P$) and unreacted sulfur thus formed separately, the sulfur in the half-target tube (of cooling zone) was charged into a storage that had previously been weighed.

To recover the obtained phosphorous nuclides, a chemical treatment was carried out as follows.

The half-target tube with $^{32}P$ present was immersed in a mixture of 20 ml of 0.1N HCl and 0.1 ml of 30% $H_2O_2$ aqueous solution and the remaining $^{32}P$ was leached out at 70° C. for two hours.

$^{32}P$ in the obtained leachate, dissolved in the HCl aqueous solution, mainly exists as orthophosphoric acid ($H_3{}^{32}PO_4$). To remove radiated cations from the leachate, purification of the leachate was carried out using column chromatography as follows. After water was poured onto a cation exchange resin (AG50W-X8H$^+$, 100-200 mesh, available from Bio Rad corp.) for swelling, a column (Bio Rad Chromatography Column, 0.8×4 cm) was filled with the swollen resin to the volume of 2 ml and then washed with 2 ml of 0.05M HCl aqueous solution. The leachate was passed through the column, and eluted $H_3{}^{32}PO_4$ solution was collected. In order to obtain $H_3{}^{32}PO_4$ still remaining in the column, two portions of 2 ml of 0.05M HCl aqueous solution were passed through the column, and eluted mixture was combined with the previously collected $H_3{}^{32}PO_4$ solution.

In addition, $H_3{}^{32}PO_4$ was prepared in the same manner as the above procedure except for cooling time (5.7 days).

EXPERIMENTAL EXAMPLE 2

1. Test for Radionuclidic Purity

Because $^{32}P$ is a pure beta emitter, the identification of the obtained $^{32}P$ solution was accomplished by a measurement of its half-life.

Five milliliters of $H_3{}^{32}PO_4$ solution charged into an ample (volume 10 ml, thickness 0.6 mm) was inserted into ionization chamber ("127-R" available from Capintec), which was previously calibrated using a standard source and then measured for its radioactivity using a beta counter ("BETA ETA C" available from Capintec).

To detect impurities, a vial with a volume of 10 ml containing a small portion of $H_3{}^{32}PO_4$ solution was inserted into a plastic box having a thickness of 3 cm to shield Bremsstrahlung radiation radiated from the $^{32}P$ A gamma radiation spectrum was recorded using a multiple-channel analyzer equipped with an HPGe detector. The results are summarized in Table 2 and in FIG. 9.

TABLE 2

| No. | Amount of sulfur | Irradiation time* | Cooling time | Radioactivity of $^{32}P$ observed | Radioactivity of $^{32}P$ Calculated** | Yield |
|---|---|---|---|---|---|---|
| 1 | 5 g | 72 hours | 25.7 days | 1.42 mCi | 1.45 mCi | 97.9% |
| 2 | 5 g | 72 hours | 5.7 days | 3.65 mCi | 3.83 mCi | 95.3% |

*fast Neutron Flux: $2.38 \times 10^{12}$ n/cm$^2\cdot$ s
**cross section: 0.065b As shown in Table 2, it was confirmed that $^{32}P$ prepared according to the method of the present invention was highly pure, since the yield of $^{32}P$ was over 95% relative to that of the calculated value.

Figure 9:
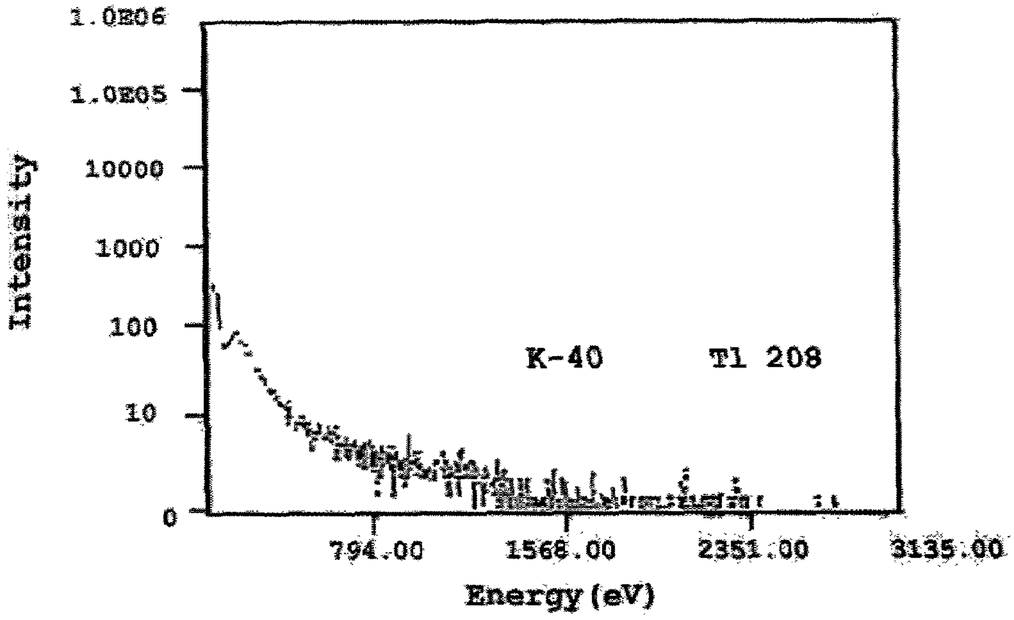
FIG. 9 is a gamma spectrum of $H_3{}^{32}PO_4$ prepared by the distillation method of sulfur in accordance with the present invention.

In addition, in FIG. 9, gamma-radiation impurities were detected at the lowest limit of $5\times10^{-5}$%, not exceeding 0.001%. In FIG. 9, K-40 (1460 KeV) and T1-208 (2614 KeV) mean a background radiation.

2. Test for Radiochemical Purity

To determine radiochemical purity of $^{32}P$ prepared in accordance with item No. 2 of Table 2, the following test was carried out.

Since the leachate, $^{32}P$ dissolved in 0.1N HCl aqueous solution, is present as $H_3{}^{32}PO_4$, the inventors carried out a paper chromatography to identify the radiochemical purity of $^{32}P$. As a stationary phase, a chromatography paper (WHATMAN PAPER No. 1 available from Whatman ltd.) which had previously been washed with diluted HCl aqueous solution followed by air-drying, was used. As a mobile phase, the mixture of isopropanol, $H_2O$, trichloroacetic acid, and ammonia (in quantities of 75 ml, 25 ml, 5 g, and 0.3 ml, respectively) was used. On the paper was pointed one drop of the mixture, dried, and then developed for two hours. Using a beta chromatogram scanner, Rf values were measured, and the radiochemical purity of $H_3{}^{32}PO_4$ or orthophosphate (Rf value: 0.76) was determined to be over 99%, while impurities remained in small quantities. This result indicates that the $^{32}P$ prepared according to the method of the present invention is highly pure.

3. Test for Solid Content

Solid content in the leachate was determined as follows.

The $H_3{}^{32}PO_4$ leachate (1 ml, 0.15mCi) was poured into a vial which was previously weighed, and liquid in the leachate was removed by evaporation under infrared lamp, and then the amount of the remaining solid was weighed (solid content: 0.2 mg/ml).

The characteristics of the $^{32}P$ prepared according to method of the invention, therefore, are summarized as follows:

| properties | Results |
|---|---|
| Radiochemical form | $H_3{}^{32}PO_4$ in diluted HCl |
| Radioactive concentration | 1.11 to 2.96 GBq (30~80 mCi) /ml |
| Radiochemical purity | Orthophosphate content >95% |
| Radionuclide purity | >99%, no extraneous gamma |
| impurities | Noticeable |
| solid content | <0.2 mg/ml |
| Appearance | clear colorless solution turns the color of glass vial into brown |

Hence, the method according to the present invention is suitable for preparation of $^{32}P$ and $^{33}P$ with about 100 mCi of radioactive concentration, acceptable for using expensive highly concentrated $^{32}S$. In addition, it is fully possible to produce $^{32}P$ and $^{33}P$ of 1~2Ci, when 2~3g of $^{32}S$ as a target material is used. The obtained $H_3{}^{32}PO_4$ can be used for preparing $^{32}P$ labeled nucleotides as well as bone pain palliation in metastasis.

As herein above described and exemplified, the method in accordance with the present invention is practicable for a preparation method for radioactive phosphorous, which comprises inserting powdery sulfur into a target tube with a neck, irradiating the powdery sulfur to convert into radioactive phosphorous, and distilling the target tube with a thermal profile followed by recovery. In addition, the method of the invention enables the effective preparation of radioactive phosphorous nuclides with high purity and safety. The method also enables reuse of used target tube for preparing $^{32}P$.

The embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for distilling sulfur for preparing radioactive phosphorous nuclide, comprising the steps of:

(a) charging powdered sulfur into a distillation zone of a target tube designed to have an upper neck, and a bottom neck which functions as a separation zone dividing the target tube into a distillation zone and a cooling zone;

(b) degassing the target tube to form a vacuum therein, and sealing the upper neck by heating;

(c) irradiating neutrons into the sealed target tube to produce radioactive phosphorous nuclide from sulfur;

(d) placing the target tube in a heating apparatus to expose the distillation zone to heat and to expose the cooling zone to air;

(e) heating the distillation zone to distill a remaining unreacted sulfur, and to allow the gasified sulfur to move into the cooling zone;

(f) condensing the gasified sulfur into a liquid phase by cooling in the cooling zone, and blocking the liquid phase from leaving the cooling zone by the bottom neck;

(g) cleaving the target tube at the bottom neck to separate the distillation zone and the cooling zone from each other, containing the radioactive phosphorous nuclide in the distillation zone and the unreacted sulfur in the cooling zone respectively.

2. The method of the claim 1, wherein in the step e), the distillation zone is heated to a temperature ranging from 160° C. to 240° C.

3. The method of the claim 1, wherein in the step e), the distillation zone is heated to a temperature ranging from 180° C. to 220° C.

4. The method of the claim 1, wherein after degassing in the step b), the inner pressure of the target tube ranges from 0.1 torr to 0.01 torr.

5. The method of the claim 1, further comprising the step of recovering the obtained radioactive phosphorous nuclide by chemical treatment.

6. The method of the claim 5, wherein the chemical treatment comprises: extracting the radioactive phosphorous nuclide with acid solution to form leachage; and purifying the leachate through column chromatography.

7. The method of the claim 1, further comprising the step of reusing the unreacted sulfur in the step e) for another preparation of radioactive phosphorous nuclide.

8. The method of the claim 1, wherein the heating step further comprises cooling unreacted sulfur by air-cooling.

* * * * *